S. W. FORD.
SHOCK ABSORBER.
APPLICATION FILED JULY 12, 1917.
1,267,395.    Patented May 28, 1918.
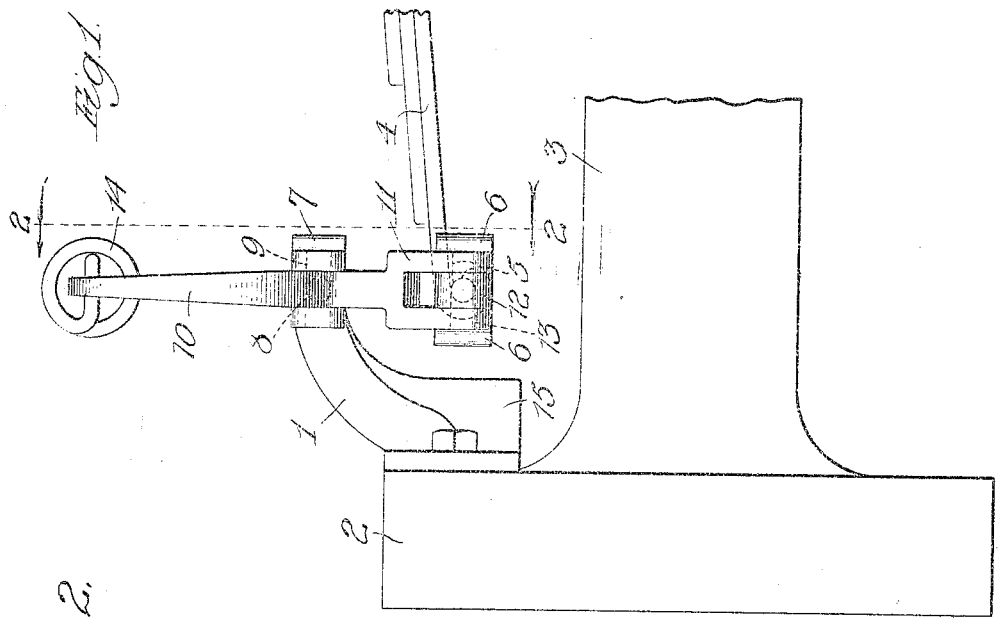
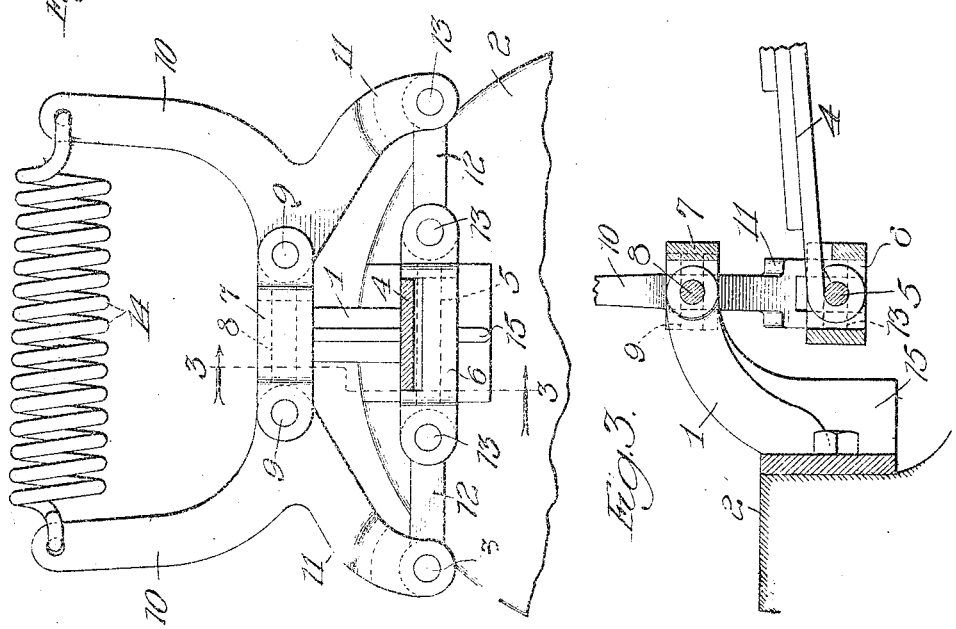
Inventor.
Shelley W. Ford
By Peirce, Fisher & Capp
Att'ys

UNITED STATES PATENT OFFICE.

SHELLEY W. FORD, OF CHICAGO, ILLINOIS, ASSIGNOR OF ONE-HALF TO ODE D. JENNINGS, OF CHICAGO, ILLINOIS.

SHOCK-ABSORBER.

1,267,395.

Specification of Letters Patent.    Patented May 28, 1918.

Application filed July 12, 1917. Serial No. 180,062.

*To all whom it may concern:*

Be it known that I, SHELLEY W. FORD, a citizen of the United States, and a resident of Chicago, county of Cook and State of Illinois, have invented certain new and useful Improvements in Shock-Absorbers, of which the following is a specification.

The invention relates to shock absorbers for vehicles and more particularly for automobiles. The improvement seeks to provide a simple and effective construction which can be readily applied to automobiles now in use and the invention consists in the features of improvement hereinafter set forth, illustrated in the preferred form in the accompanying drawing and more particularly pointed out in the appended claims.

In the drawings, Figure 1 is an elevation of a portion of a vehicle spring and a wheel axle casing with the improved shock absorber applied thereto. Fig. 2 is a side view with parts shown in section on the line 2—2 of Fig. 1. Fig. 3 is a detail section on the line 3—3 of Fig. 2.

The improved shock absorber is adapted to be interposed between a vehicle spring and a member which supports or is supported by the springs. In the construction shown, a bracket 1 is fixed to the enlarged end 2 of the axle casing 3. In the constructions now in use, a vehicle spring leaf 4 extends parallel to the axle and is supported from the bracket 1 by a swinging link. The present improved shock absorber is adapted to be substituted for the link or swinging connection in such constructions.

The end of the spring 4 engages a horizontal pivot bolt or stud 5 which is carried by a horizontal member 6. A horizontal member 7 is connected to the upper end of the bracket 1 by a horizontal pivot or stud 8. The ends of the members 6 and 7 are forked to engage pairs of connecting levers and links.

In the preferred form shown, a pair of oppositely disposed bell crank levers are pivotally connected to the forked ends of the member 7 by studs 9, these bell crank levers being provided with upwardly projecting arms 10 and downwardly projecting arms 11. Links 12 are pivotally connected to the lower forked ends of the lever arms 11 and to the forked ends of the member 6 by studs 13. The upwardly projecting lever arms 10 are connected by a heavy, shock absorbing spring 14 which resists the vertical movement of the spring engaging member 6.

Preferably the parts are so arranged that with a normal load the links 12 will be substantially horizontal so that either an upward or a downward movement of the spring engaging member 6 will draw the lower lever arms together and spread the upper lever arms against the tension of the spring 14. In this way, the spring 14 tends to check the movement of the end of the spring 4 in either direction and absorbs all shocks as the vehicle passes over irregularities on the roadway.

It should be noted that the horizontal pivots 9 and 13 of the levers and links are arranged to permit the vertical movement of the member 6 and of the end of the vehicle spring supported thereby, and that the axes of these pivots are at right-angles to the axes of the pivots 5 and 8 which permit the horizontal movement of member 6 and the end of the vehicle spring. That is to say, the supporting bracket 1 and vehicle spring 4 are connected by a linkage having two sets of pivots arranged at right angles, one of which permits the horizontal movement of the end of the spring and the other the vertical movement thereof and the shock absorbing spring 14 tends to check the vertical movement. The construction thus not only acts as a shock absorber, but also as a swinging shackle for the vehicle spring. To limit the horizontal movement, the bracket 1 is preferably provided with a projecting stop or rib 15. It is, of course, understood that a shock absorbing device is provided at each end of the spring 4.

Changes may be made in the details set forth without departure from the essentials of the invention as defined in the claims.

I claim as my invention:

1. In a shock absorber, the combination with a bracket and a vehicle spring, a pair of oppositely disposed levers pivoted to said bracket, links connecting said levers to the end of said vehicle spring, and a spring connecting said levers for resisting the vertical movement of the end of said vehicle spring.

2. In a shock absorber, the combination with a bracket and a vehicle spring, of a pair of oppositely disposed bell crank levers pivotally mounted on said bracket, links connecting the lower arms of said bell crank levers to the end of said vehicle spring and a spring connecting the upper arms of said levers.

3. In a shock absorber, the combination with a bracket and a vehicle spring, of a connecting linkage between said parts having two sets of pivots arranged at right angles to permit the horizontal and vertical movements respectively of the end of said vehicle spring, and a shock absorbing spring connected to said linkage for resisting the vertical movement of the end of said vehicle spring.

4. In a shock absorber, the combination with a bracket and a vehicle spring, of two members pivotally mounted respectively on said bracket and the end of said spring, two, separate opposed levers pivoted to one of said members to swing to and from each other, links connecting said levers to the other of said members and a spring connecting said levers for resisting the vertical movement of the end of said vehicle spring, the pivoted connections between said members, said bracket and said vehicle spring being arranged to permit the horizontal movement of the end of said vehicle spring.

5. In a shock absorber, the combination with a bracket and a vehicle spring, of two members horizontally pivoted respectively to said bracket and to the end of said spring, a pair of opposed levers pivoted to said bracket engaging member, links pivotally connected to said levers and to said spring-engaging member, the pivotal axes of said levers and links being at right angles to the pivotal axes of said members and a spring connecting said levers for resisting the vertical movement of said spring-engaging member.

6. A shock absorber comprising two members, a pair of opposed levers pivotally connected to one of said members, links pivotally connected to said levers and to the other of said members, a shock-absorbing spring connecting said levers and pivots arranged at right angles to the pivotal axes of said levers and links for respectively connecting said members to a vehicle spring and to a wheel supported part.

7. In a shock absorbing shackle for vehicle springs, the combination with a vehicle spring and a supported member, of two, separate levers both pivoted on one of said parts to swing to and from each other in a plane at right angles to said vehicle spring, connections between said levers and the other of said parts and a spring connecting said levers for resisting the vertical movement of said vehicle spring.

8. In a shock absorber, the combination with a vehicle spring and a supported member, of two, separate, bell crank levers both pivoted on one of said parts to swing in a plane at right angles to said vehicle spring, links connecting one arm of each of said levers to the other of said parts and a spring connecting the other arms of said levers for resisting the movement of said vehicle spring.

9. In a shock absorbing shackle for vehicle springs, the combination with a vehicle spring and a supported part, of two members pivotally mounted respectively on said part and the end of said vehicle spring, two separate opposed levers both pivoted on one of said members to swing to and from each other in a plane at right angles to said vehicle spring, links connecting said lever arms and the other of said members, and a spring connecting said levers for resisting the vertical movement of the end of said vehicle spring, the pivotal mounting of said members being arranged to permit the horizontal movement of the end of said vehicle spring.

SHELLEY W. FORD.